United States Patent [19]

Weaver

[11] 4,042,519

[45] Aug. 16, 1977

[54] FERRIMAGNETIC GLASS-CERAMICS

[75] Inventor: Edward A. Weaver, Toledo, Ohio

[73] Assignee: Owens-Illinois, Inc., Toledo, Ohio

[21] Appl. No.: 333,286

[22] Filed: Feb. 16, 1973

[51] Int. Cl.² .................. C04B 35/14; C04B 35/30; C04B 35/38

[52] U.S. Cl. .................. 252/62.59; 252/62.6; 252/62.62; 252/62.64; 106/39.6

[58] Field of Search ............ 252/62.59, 62.6, 62.62, 252/62.64; 106/39.6

[56] References Cited

U.S. PATENT DOCUMENTS

| | | | |
|---|---|---|---|
| 3,117,881 | 1/1964 | Henry et al. | 106/39.6 |
| 3,193,503 | 7/1965 | Smith | 252/62.59 |
| 3,630,911 | 12/1971 | Schultz | 252/62.59 UX |
| 3,694,360 | 9/1972 | Weaver | 252/62.59 |

FOREIGN PATENT DOCUMENTS

| | | | |
|---|---|---|---|
| 1,064,867 | 9/1959 | Germany | 252/62.59 |

*Primary Examiner*—Jack Cooper
*Attorney, Agent, or Firm*—Howard G. Bruss, Jr.; E. J. Holler; Charles S. Lynch

[57] ABSTRACT

Disclosed are ferrimagnetic glass-ceramics prepared by the in situ, thermal crystallization of certain nickel-zinc; manganese-zinc; and manganese-magnesium crystalline ferrites in a residual glassy matrix.

13 Claims, No Drawings

FERRIMAGNETIC GLASS-CERAMICS

This invention relates to ferrimagnetic glass-ceramics, and the manufacture of same from thermally crystallizable glass compositions. More particularly, this invention relates to ferrimagnetic glass-ceramics having desirable electrical and magnetic properties, and a process whereby these desired properties can be reliably reproduced.

Magnetic ferrite materials are used for components in making electrical and electronic circuits including transformers, inductors, switching elements, microwave circuits, and other high-frequency apparatus. Such ferrites are conventionally formed by a sintering technique. Unfortunately, this technique can be economically undesirable because it is complex and time-consuming. Furthermore, difficulty is often encountered in consistently producing ferrites to meet performance specification due to the variability inherent in sintering manufacturing techniques. It is well known that sintered ferrites having specified magnetic and electrical properties at microwave frequencies are difficult to reproduce due at least in part to the high shrinkage and the unpredictability of the final density, grain size, and structure.

The art is replete with techniques for forming sintered ferrites. U.S. Pat. No. 3,532,630 concerns the preparation of sintered nickel-zinc ferrites containing up to 15 percent by weight of inorganic silicates. U.S. Pat. No. 3,532,629 concerns nickel zinc ferrites of the type disclosed in U.S. Pat. No. 3,532,630 containing an additional proportion of thorium oxide. U.S. Pat. No. 2,549,089 concerns the preparation of sintered manganese zinc ferrites which contain a specified proportion of lithium to achieve specified electrical performance characteristics. U.S. Pat. No. 3,674,694 concerns the preparation of sintered manganese ferrites having specified proportion of calcium oxide and nickel oxide. U.S. Pat. No. 3,671,436 concerns the preparation of sintered ferrimagnetic materials containing nickel zinc ferrites. The book entitled "The Structure and Properties of Materials," Volume IV at Page 217, further describes commercial manganese-zinc ferrites and nickel-zinc ferrites of the sintered type.

Ferrimagnetic glass-ceramics have also been prepared in the past. For instance, U.S. Pat. No. 3,193,503 discloses magnesia-iron oxide-silica glass-ceramic ferrites; U.S. Pat. No. 3,195,030 concerns semi-crystalline ceramic bodies containing ferroelectric compounds in the barium titanate family; U.S. Pat. No. 3,694,360 concerns ferrimagnetic glass-ceramics containing lithium ferrites which optionally contain zinc oxide; U.S. Pat. No. 3,630,911 concerns glass-ceramics containing lead ferrites.

From the foregoing, it is apparent that the art is lacking a method for preparing ferrimagnetic glass-ceramics in the nickel-zinc; manganese-zinc; and manganese-magnesium compositional fields.

Accordingly, it is an object of the present invention to provide for the manufacture of ferrimagnetic glass-ceramics in the nickel-zinc; manganese and manganese-zinc compositional fields.

It is a further object of this invention to provide ferrimagnetic glass-ceramics having the requisite electrical and magnetic properties and which can be readily formed in any desired configuration.

In attaining these objects, one feature resides in forming a homogeneous, thermally crystallizable parent glass composition consisting essentially of:

| COMPONENT | WEIGHT % |
| --- | --- |
| $K_2O$ | 2 – 20 |
| $SiO_2$ | 30 – 60 |
| $Fe_2O_3$ | 15 – 45 |
| ZnO | 0 – 20 |
| MgO | 0 – 10 |
| MO | 3 – 25 |
| wherein MO is | |
| NiO | 0 – 20 |
| MnO | 0 – 20 | wherein $Fe_2O_3$, ZnO, NiO, MnO and MgO are present in the proportions defined by $ZnO_{1-x}MO_xFe_2O_3$, wherein $x$ is a whole or fractional number ranging from 0.1 to 1 inclusively; or $MgO_{0.5}MnO_{0.5}Fe_2O_3$.

In a practice preferred for economy and efficiency within the above described range, the thermally crystallizable parent glass composition consists essentially of:

| COMPONENT | WEIGHT % |
| --- | --- |
| $K_2O$ | 5 – 15 |
| $SiO_2$ | 35 – 55 |
| $Fe_2O_3$ | 20 – 40 |
| ZnO | 3 – 17 |
| MO | 5 – 20 | wherein $x$ ranges from 0.3 to 1, and MO and $x$ have the meaning set forth above.

In the nickel-zinc glass-ceramic ferrites, MnO and MgO are preferably substantially absent. In the manganese-zinc glass-ceramic ferrites, MgO and NiO are preferably substantially absent. In the manganese-magnesium glass-ceramic ferrites, ZnO and NiO are substantially absent. By substantially absent is meant the amount present is insufficient to prevent crystallization of the designated crystalline phase. This amount is usually less than a few percent by weight.

Another feature of the invention resides in melting the ingredients in the proper proportions to form a molten parent glass and casting or otherwise forming the parent glass into the desired shape, and in situ thermally crystallizing the shaped mass by heat treatment to produce a ferrimagnetic glass-ceramic body.

Other objects, features, and advantages of this invention will become apparent from the following description.

The term glass-ceramic is used herein according to its conventional meaning and refers to a semicrystalline ceramic body which is composed of at least one crystalline phase uniformly dispersed in a residual glassy phase or matrix. Such crystalline phase is formed by the in situ thermal crystallization of a parent glass composition.

In the compositions of invention, it is believed that the silica does not enter into the crystalline structure of the magnetic ferrite crystals. The presence of silica is beneficial in lowering the melting temperature, in controlling the crystallization so that articles can be properly formed before crystallization is too advanced, and in providing the main basis for the glassy matrix of the glass-ceramic products on invention.

The $K_2O$ in the compositions of inventions is employed to modify the $SiO_2$ glassy matrix and to prevent shifting the ferrous-ferric equilibrium to the oxidized state. Additionally, the use of $Li_2O$ (rather than $K_2O$)

would result in the formation of lithium ferrites which are not of interest here.

The parent glass composition of the invention can be crystallized in a number of ways. In one method the parent glass is simply slowly cooled after being cast, pressed, or otherwise formed into the desired shape. During the cooling, crystallization spontaneously takes place to form the glass-ceramic body. Such products can often be further heat treated to obtain further crystallization, if desired.

On the other hand, the molten parent glass compositions can be quenched to form a glass and then the crystallization effected by a heat treatment comprising nucleation, development and crystallization stages.

The heat treatment process for forming glass-ceramics from a parent glass usually includes a nucleation stage at substantially the temperature of the annealing point (viscosity $10^{13}$ poises) of the parent glass, a development stage at a temperature below the fiber softening point of the parent glass (preferably at a viscosity in the range of $10^8$ to $10^{12}$ poises) and a crystallization stage (at a temperature preferably 150° F. to 300° F. above the fiber softening point of the parent glass (i.e., viscosity of $10^{7.65}$ poises).

In actual practice, it has been found that all three stages of the heating process can be accomplished by continuously advancing the temperature through regions of nucleation development and crystallization. In many compositions of the present invention, it has been found that a "formal" development stage is not required because the time required to heat the article from the nucleation temperature to the crystallization temperature is sufficient. Additional details for forming glass-ceramic bodies are described in U.S. Pat. No. 3,117,881, the disclosure of which is incorporated by reference.

In most compositions of invention, the crystallization of the parent glass to form the ferrimagnetic glass-ceramic can be accomplished at temperatures in the range of 500° C. to 1200° C. for time periods ranging from ¼ hours to 20 hours and longer. In some cases heat treatments of up to 100 hours and longer can be used with the lower temperatures usually requiring the longer time periods.

The principles of the present invention are illustrated in the examples that follow wherein all percentages are weight percentages, all parts are parts by weight, and all temperatures are in ° C. unless stated otherwise.

Procedures

Compositions are prepared in batches of 500 parts from reagent grade $Fe_2O_3$, $K_2CO_3$, ZnO, NiO, MgO and $MnCO_3$ and $SiO_2$. The batches are separately melted in platinum crucibles in an electric muffle furnace at 1540° C. in an air atmosphere for 4 hours with periodic manual stirring until a homogeneous molten glass is obtained.

An example of a 500 part batch used in preparing Example 17 is set forth below:

| COMPONENT | PARTS BY WEIGHT |
|---|---|
| $SiO_2$ | 225.0 "Amersil" brand of silica |
| $K_2CO_3$ | 73.4 Reagent grade |
| $Fe_2O_3$ | 152.5 Reagent grade |
| ZnO | 39.0 Reagent grade |
| $MnCO_3$ | 54.2 Reagent grade |
| Rating | Glass Forming Tendency |

| | -continued |
|---|---|
| 1 | Stable enough to draw rods from the molten glass. |
| 2 | The molten glass could be quenched to form plates with no spontaneous crystallization. |
| 3 | The molten glass could be quenched to form plates having some spontaneous crystallization, usually in isolated areas. |
| 4 | The molten glass could be quenched to form plates with significant spontaneous crystallization. |
| 5 | Only a small percentage of glass is formed by quenching. |

The glass compositions are then heat treated by several different time-temperature profiles to crystallize the ferrimagnetic crystalline phase therein. The magnetic properties of the resulting ferrimagnetic glass-ceramics are evaluated and reported in the Tables as a function of composition, and time and temperature of heat treatment.

The properties are measured by two techniques designated herein as "Bulk" and "Powder."

In the Bulk method melted samples are cast onto room temperature steel plates into bars ¼ × 2½ × 1½ inches. One-quarter inch steel bars form the outer edges of the casting mold. Bars ¼ × ¼ × 2 inches are cut from the quenched sample. Discs 1 inch in diameter are required for some samples. In some cases the samples are spontaneously crystallized, and in other cases the samples are essentially vitreous. The bars are used for property measurement. When heat treatments are included, the bar sample is subjected to the stated heat treatment before property measurement.

The Powder method is employed to minimize the affect of the sample geometry. In this method the sample is ground to minus 100 mesh and packed into a 1.27 mm (I.D.) glass tube 6 cm long. Weighings are made before and after loading the tube and density connections are made. In comparing the results, Bulk data should be compared with Bulk data, and Powder data should be compared with Powder data.

Magnetic measurements by both Bulk and Powder techniques are made on samples of the compositions of this invention in order to demonstrate the effect of the composition, thermal history, and method of preparation on such properties. The field strength (H) in Oersted and magnetic induction (B) in Gauss are determined by placing the sample in a thousand (1000) Oersted alternating electromagnetic field and recording the current induced. The values which are of primary concern with respect to this invention are the maximum magnetic induction ($B_m$), the residual flux or remanence ($B_r$) and coercivity ($H_c$).

The maximum magnetic induction ($B_m$) at an applied field of a thousand Oersteds as measured on a Scientific Atlanta Model 651B B-H meter appears to vary directly with the composition and heat treatment.

The coercivity ($H_c$) is defined as reverse field force which is necessary to reduce the intensity of the residual magnetization to zero.

The resistance ($R_{vom}$) in ohms is determined by placing the probes of a standard Volt-ohm-meter about ½ centimeter apart on the surface of the Bulk sample and reading the ohmmeter scale. This test is performed to give a general idea of the surface resistance of the samples thus prepared.

TABLE I

Parent Glass Compositions (in Weight %) for Nickel-Zinc Glass-Ceramic Ferrites

| Component | Ex 1 | Ex 2 | Ex 3 | Ex 4 | Ex 5 | Ex 6 | Ex 7 | Ex 8 | Ex 9 | Ex 10 | Ex 11 | Ex 12 |
|---|---|---|---|---|---|---|---|---|---|---|---|---|
| $SiO_2$ | 30 | 30 | 40 | 30 | 35 | 35 | 35 | 40 | 45 | 50 | 55 | 60 |
| $Fe_2O_3$ | 31 | 31 | 25 | 42 | 38 | 38 | 38 | 34 | 31 | 26.5 | 22.4 | 18.3 |
| $K_2O$ | 5 | 8 | 10 | 8 | 9 | 9 | 9 | 10 | 10 | 11 | 12 | 13 |
| MO wherein MO is | | | | | | | | | | | | |
| ZnO | 16 | 16 | 12 | 14.4 | 13 | 9.4 | | 11.5 | 10 | 9.0 | 7.6 | 6.3 |
| NiO | 15 | 15 | 12 | 5.6 | 5 | 8.6 | 18 | 4.5 | 4 | 3.5 | 3 | 2.4 |
| x* | 0.5 | 0.5 | 0.5 | 0.3 | 0.3 | 0.5 | 1.0 | 0.3 | 0.3 | 0.3 | 0.3 | 0.3 |

*x in Formula $ZnO_{1-x}MO_xFe_2O_3$
Example 1 also contains 3% by weight $B_2O_3$.

TABLE II

Parent Glass Compositions (in Weight %) for Manganese-Zinc Glass-Ceramic Ferrites

| Component | Ex 13 | Ex 14 | Ex 15 | Ex 16 | Ex 17 | Ex 18 | Ex 19 | Ex 20 |
|---|---|---|---|---|---|---|---|---|
| $SiO_2$ | 30 | 35 | 35 | 40 | 45 | 50 | 55 | 60 |
| $Fe_2O_3$ | 42 | 38 | 38 | 34 | 30.5 | 26.4 | 22.4 | 18.3 |
| $K_2O$ | 8 | 9 | 9 | 10 | 10 | 11 | 12 | 13 |
| MO wherein MO is | | | | | | | | |
| ZnO | 10.8 | 9.7 | | 8.65 | 7.8 | 6.8 | 5.7 | 4.7 |
| MnO | 9.2 | 8.3 | 18 | 7.35 | 6.7 | 5.8 | 4.9 | 4.0 |
| x* | 0.5 | 0.5 | 1 | 0.5 | 0.5 | 0.5 | 0.05 | 0.05 |

*x in Formula $ZnO_{1-x}MO_xFe_2O_3$

TABLE III

Parent Glass Compositions (in Weight %) for Manganese-Magnesium Glass-Ceramic Ferrites

| Component | Ex 21 | Ex 22 | Ex 23 |
|---|---|---|---|
| $SiO_2$ | 40 | 50 | 60 |
| $Fe_2O_3$ | 37.1 | 28.9 | 20 |
| $K_2O$ | 10 | 11 | 13 |
| MgO | 4.7 | 3.6 | 2.5 |
| MnO | 8.2 | 6.5 | 4.5 |

TABLE IV

Magnetic and Physical Properties of Inventive Glass-Ceramic Ferrites

| Example # | Magnetic Properties* As cast | | | Magnetic Properties* After 100 hrs. at 800° C. | | | Thermal Expansion × 10⁷/° C. (0–300° C.) As cast | Thermal Expansion × 10⁷/° C. (0–300° C.) After 64 hrs. at 800° C. | Density gm/cm³ As cast | $R_{vom}$ (ohms) ÷ 1000 As cast | Type of Crystalline phase after 100 hrs. at 800° C. | G.F.T.** |
|---|---|---|---|---|---|---|---|---|---|---|---|---|
| | $B_m$ | $B_r$ | $H_c$ | $B_m$ | $B_r$ | $H_c$ | | | | | | |
| 1 | 830 | 33 | 20 | | | | | | 3.47 | 500 | Spinel | 4–5 |
| 2 | 860 | 48 | 15 | 738 | 34 | 20 | 85.1 | 78.1 | 3.58 | 80 | " | 4–5 |
| 3 | 548 | 33 | 15 | 616 | 34 | 30 | 82.9 | 79.7 | 3.27 | 350 | " | 4–5 |
| 4 | 1340 | 38 | 10 | 1298 | 38 | 10 | | | 3.51 | 3 | " | 5 |
| 5 | 1040 | 23 | 7 | 1181 | 39 | 10 | 84.6 | 84.3 | 3.35 | 4–7 | " | 5 |
| 6 | 955 | 34 | 10 | 1145 | 76 | 20 | | | 3.37 | 9 | " | 5 |
| 7 | 824 | 110 | 35 | 754 | 79 | 40 | | | 3.39 | 9 | " | 5 |
| 8 | 760 | 17 | 8 | 831 | 32 | 15 | 83.6 | 82.3 | 3.18 | 11 | " | 3–4 |
| 9 | 630 | 14 | 15 | 692 | 31 | 20 | 77.9 | 77.9 | 3.04 | 25 | " | 3 |
| 10 | 480 | 174 | 150 | 456 | 54 | 70 | 77.1 | 74.4 | 2.91 | 600 | | 3 |
| 11 | 54 | 11 | 90 | 137 | 20 | 90 | 75.3 | 75.1 | 2.77 | ∞ | | 1 |
| 12 | 0 | | | 30 | 4 | 80 | 70.7 | 72.2 | 2.66 | ∞ | | 1 |
| 13 | 1660 | 77 | 10 | 1651 | 95 | 10 | 97.7 | 95.9 | 3.7 | 0.7 | " | 5 |
| 14 | 1340 | 64 | 8 | 1262 | 63 | 15 | | | 3.33 | 0.7 | " | 5 |
| 15 | 1230 | 68 | 15 | 1090 | 64 | 20 | 96.8 | 97.4 | 3.28 | 1.7 | " | 4–5 |
| 16 | 920 | 67 | 20 | 926 | 139 | 40 | 91.0 | 91.0 | 3.15 | 4–10 | " | 3–4 |
| 17 | 840 | 347 | 175 | 767 | 280 | 120 | 82.2 | 83.7 | 3.02 | 30–300 | | 3 |
| 18 | 587 | 337 | 320 | 561 | 192 | 130 | 80.0 | 81.2 | 2.86 | 600 | | 3 |
| 19 | | | | | | | | | 2.79 | ∞ | | 2 |
| 20 | 2 | | | 95 | 4 | 15 | 70.4 | 72.1 | 2.59 | ∞ | | 1–2 |
| 21 | 865 | 243 | 120 | 970 | 135 | 60 | 89.3 | 92.5 | 3.01 | 3 | | 3 |
| 22 | 595 | 342 | 280 | 536 | 298 | 280 | 78.5 | 81.5 | 2.85 | 400 | | 2–3 |
| 23 | 0.9 | | | 125 | 21 | 100 | 70.8 | 71.3 | 2.61 | ∞ | | 1–2 |

*Measured by Bulk Technique
**Glass Forming Tendency

TABLE V

Maximum Magnetization (B in Gauss) As a Function of Heat Treatment

| Example # | As cast | Temperature (° C.) for 16 Hours of Heat Treatment | | | | | | | | Technique |
|---|---|---|---|---|---|---|---|---|---|---|
| | | 600° | 650° | 700° | 750° | 800° | 850° | 900° | 950° | |
| 1 | | | | | | | | | | |
| 2 | 780 | | | | | 839 | | 722 | | Bulk |
| 3 | 548 | | | | | 548 | | 582 | | Bulk |
| 4 | 1145 | | | | | 1221 | | 1221 | | Bulk |
| 5 | 1040 | | | | | 1180 | | 1038 | | Bulk |
| 6 | 955 | | | | | 1145 | | 954 | | Bulk |
| 7 | 714 | | | | | 795 | | 745 | | Bulk |

TABLE V-continued

Maximum Magnetization (B in Gauss) As a Function of Heat Treatment

| Example # | As cast | Temperature (° C.) for 16 Hours of Heat Treatment | | | | | | | | |
|---|---|---|---|---|---|---|---|---|---|---|
| | | 600° | 650° | 700° | 750° | 800° | 850° | 900° | 950° | Technique |
| 8 | 735 | 860 | 860 | 860 | 900 | 1000 | 1050 | 1000 | 1000 | Powder |
| 9 | 630 | 620 | 625 | 650 | 640 | 610 | 565 | 500 | 590 | Powder |
| 10 | 100 | 150 | 220 | 230 | 260 | 340 | 220 | 225 | 260 | Powder |
| 11 | 0 | 0 | 30 | 32 | 40 | 70 | 110 | | | Bulk |
| 12 | 0 | 0 | 0 | 0 | 20 | 30 | | 22 | | Bulk |
| 13 | 1660 | | | | | 1650 | | 1603 | | Bulk |
| 14 | 1290 | | | | | 1260 | | 1210 | | Bulk |
| 15 | 1122 | | | | | 1154 | | 1110 | | Bulk |
| 16 | 880 | 920 | 920 | 1030 | 1080 | 970 | 920 | 880 | 800 | Powder |
| 17 | 515 | 565 | 640 | 685 | 700 | 670 | 620 | 580 | 540 | Powder |
| 18 | 260 | 315 | 400 | 500 | 530 | 475 | 460 | 440 | 415 | Powder |
| 19 | 0 | 0 | 15 | 30 | 170 | 260 | 250 | 190 | 180 | Powder |
| 20 | 0 | | | | 25 | 66 | | 94 | | Bulk |
| 21 | 355 | 360 | 370 | 410 | 475 | 485 | 485 | 485 | 500 | Powder |
| 22 | 50 | 70 | 110 | 160 | 185 | 200 | 215 | 220 | | Bulk |
| 23 | 0 | | | | | 117 | | 132 | | Bulk |

TABLE VI

Coercivity (H in Oersteds) As a Function of Heat Treatment

| Example # | As cast | Temperature (° C) for 16 Hours of Heat Treatment | | | | | | | | |
|---|---|---|---|---|---|---|---|---|---|---|
| | | 600° | 650° | 700° | 750° | 800° | 850° | 900° | 950° | Technique |
| 1 | | | | | | | | | | |
| 2 | | | | | | 20 | | 20 | | Bulk |
| 3 | | | | | | 20 | | 20 | | Bulk |
| 4 | | | | | | 10 | | 10 | | Bulk |
| 5 | | | | | | 15 | | 10 | | Bulk |
| 6 | | | | | | 20 | | 10 | | Bulk |
| 7 | | | | | | 30 | | 40 | | Bulk |
| 8 | | | 90 | 70 | 70 | 90 | 60 | 50 | 40 | Powder |
| 9 | | 100 | 170 | 230 | 230 | 220 | 200 | 120 | 110 | 60 Powder |
| 10 | | 100 | 120 | 140 | 130 | 130 | 130 | 120 | 100 | 90 Powder |
| 11 | | | | | | 120 | | 80 | | Bulk |
| 12 | | | | | | 120 | | 120 | | Bulk |
| 13 | | | | | | 10 | | 10 | | Bulk |
| 14 | | | | | | 20 | | 10 | | Bulk |
| 15 | | | | | | 20 | | 20 | | Bulk |
| 16 | | | 330 | 315 | 260 | 170 | 50 | 30 | 15 | Powder |
| 17 | | 260 | 280 | 320 | 260 | 260 | 260 | 70 | 60 | 35 Powder |
| 18 | | 70 | 70 | 80 | 100 | 150 | 335 | 100 | 65 | 80 Powder |
| 19 | | | | | 110 | 125 | 180 | 30 | 20 | Powder |
| 20 | | | | | | 40 | | 80 | | Bulk |
| 21 | | 90 | 90 | 90 | 100 | 120 | 180 | 170 | 140 | 80 Powder |
| 22 | | | | 30 | 70 | 100 | 130 | 160 | | Bulk |
| 23 | | | | | | 160 | | 120 | | Bulk |

X-ray analysis of the ferrimagnetic glass-ceramics produced in the foregoing examples indicate a spinal type crystalline structure. The exact spinel phase is not determined because of the complex procedures required.

$B_m$ (expressed in Gauss), which is the magnetization or magnetic induction at a field (H) of 1000 oersteds, is found to reach a maximum for heat treatments of about 800° C. for 16 hours in the nickel-zinc manganese-zinc glass-ceramics. $B_m$ increases with increasing volume % of ferrimagnetic crystalline phase and generally increases with heat treatment. Most dramatic increases are observed in compositions containing large concentrations of $SiO_2$. The decrease in $B_m$ at heat treatments in excess of 16 hours at 800° C. is probably due to the partial dissolution of spinel. In the manganese-magnesium glass-ceramic ferrites, $B_m$ gradually increases with increasing temperature of heat treatment. $B_m$ is directly proportional to the volume percent of spinel phase present.

The hysteresis loops for all compositions are not very square; that is, values of $B_r$, magnetic remanence when H is reduced to zero, are small.

$H_c$, which is the field required to reduce the magnetic induction to zero, usually reaches its lowest value at the highest heat-treatment temperature.

$H_c$ generally increases with decreasing crystal size, which is a function of thermal history, heat treatment and amount of grinding of powder. In general, the $H_c$ increases with heat treatments to about 800° C. and then decreases after heating to higher temperatures. This is probably due to the growth of the other spinel crystals. A large value of $H_c$ is indicative of small crystalline particle size and vice versa. Large values of $H_c$ in cast samples (i.e., no heat treatment) are usually found in samples with high silica content.

$H_c$ is lowest for cast samples containing the largest concentration of large spinel crystals and highest for low concentrations of small spinel crystals.

After the first few hours of heat treatment, $B_m$ and $H_c$ remained virtually unchanged with time up to 100 hours at 800° and 900° C.

Having thus described the invention, what is claimed is:

1. A homogeneous thermally crystallizable glass composition consisting essentially of:

| COMPONENT | WEIGHT % |
|---|---|
| $K_2O$ | 2 – 20 |
| $SiO_2$ | 30 – 60 |
| $Fe_2O_3$ | 15 – 45 |
| ZnO | 0 – 20 |
| MgO | 0 – 10 |

| COMPONENT | WEIGHT % |
| --- | --- |
| MO | 3 – 25 |
| wherein MO is | |
| NiO | 0 – 20 |
| MnO | 0 – 20 | wherein $Fe_2O_3$, ZnO, NiO, MnO and MgO are present in the proportions defined by $ZnO_{1-x}MO_xFe_2O_3$, wherein $x$ is a whole or fractional number ranging from 0.1 to 1 inclusively; or $MgO_{0.5}MnO_{0.5}Fe_2O_3$.

2. The glass composition of claim 1 consisting essentially of:

| COMPONENT | WEIGHT % |
| --- | --- |
| $K_2O$ | 5 – 15 |
| $SiO_2$ | 35 – 55 |
| $Fe_2O_3$ | 20 – 40 |
| ZnO | 3 – 17 |
| MO | 5 – 20 |

3. A ferrimagnetic glass-ceramic article comprising a substantially uniform dispersion of a ferrimagnetic crystalline phase of the spinel structure defined by the formula $ZnO_{1-x}MO_xFe_2O_3$, wherein $x$ is a whole or fractional number ranging from 0.1 to 1 inclusively; or $MgO_{0.5}MnO_{0.5}Fe_2O_3$ in a residual glassy matrix, said article having been formed by the in-situ thermal crystallization of the glass composition of claim 2.

4. The composition of claim 1 wherein $x$ ranges from 0.3 to 1.

5. The glass composition of claim 1 wherein MnO and MgO are substantially absent.

6. A ferrimagnetic glass-ceramic article comprising a substantially uniform dispersion of a ferrimagnetic crystalline phase of the spinel structure in a residual glassy matrix, said article having been formed by the in-situ thermal crystallization of the glass composition of claim 5.

7. The glass composition of claim 1 wherein MgO and NiO are substantially absent.

8. A ferrimagnetic glass-ceramic article comprising a substantially uniform dispersion of a ferrimagnetic crystalline phase of the spinel structure in a residual glassy matrix, said article having been formed by the in-situ thermal crystallization of the glass composition of claim 7.

9. The glass composition of claim 1 wherein ZnO and NiO are substantially absent.

10. A ferrimagnetic glass-ceramic article comprising a substantially uniform dispersion of a ferrimagnetic crystalline phase of the spinel structure in a residual glassy matrix, said article having been formed by the in-situ thermal crystallization of the glass composition of claim 9.

11. A ferrimagnetic glass-ceramic article comprising a substantially uniform dispersion of a ferrimagnetic crystalline phase of the spinel structure defined by the formula $ZnO_{1-x}MO_xFe_2O_3$, wherein $x$ is a whole or fractional number ranging from 0.1 to 1 inclusively; or $MgO_{0.5}MnO_{0.5}Fe_2O_3$ in a residual glassy matrix, said article having been formed by the in-situ thermal crystallization of the glass composition of claim 1.

12. The method for forming a ferrimagnetic glass-ceramic article comprising forming said article from the composition of claim 1 and heat treating said article for a time ranging from 15 minutes to 100 hours at a temperature ranging from 500° C to 1200° C to in situ crystallize a ferrimagnetic crystalline phase of the spinel structure defined by the formula $ZnO_{1-x}MO_xFe_2O_3$, wherein $x$ is a whole or fractional number ranging from 0.1 to 1 inclusively; or $MgO_{0.5}MnO_{0.5}Fe_2O_3$.

13. The method of claim 12 wherein said glass composition is the composition of claim 2.

* * * * *

UNITED STATES PATENT AND TRADEMARK OFFICE
CERTIFICATE OF CORRECTION

PATENT NO. : 4,042,519
DATED : Aug. 16, 1977
INVENTOR(S) : Edward A. Weaver

It is certified that error appears in the above—identified patent and that said Letters Patent are hereby corrected as shown below:

Cols. 5 and 6, Table II, under EX 19, last line, "0.05" should be --0.5--. Col. 7, line 44, "spinal" should be --spinel--.

Signed and Sealed this

Seventh Day of November 1978

[SEAL]

Attest:

RUTH C. MASON
Attesting Officer

DONALD W. BANNER
Commissioner of Patents and Trademarks